Nov. 20, 1962   G. T. RANDOL   3,064,764
DISC-TYPE BRAKE
Filed Aug. 2, 1960   3 Sheets-Sheet 1

Inventor

Nov. 20, 1962 G. T. RANDOL 3,064,764
DISC-TYPE BRAKE
Filed Aug. 2, 1960 3 Sheets-Sheet 2
FIG. 2.
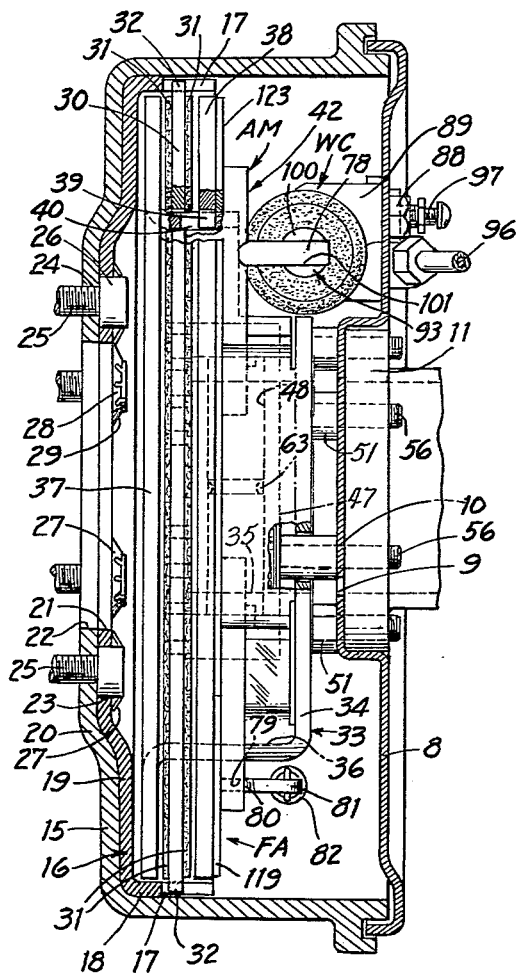
FIG. 8.
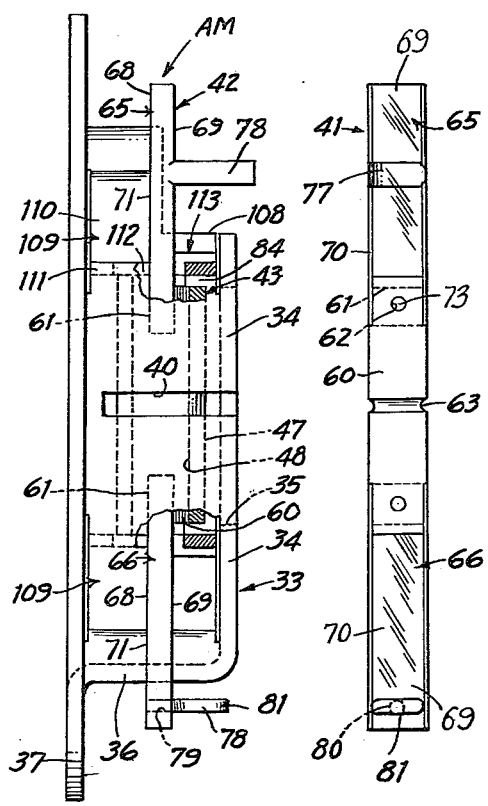
FIG. 10.
FIG. 5A.
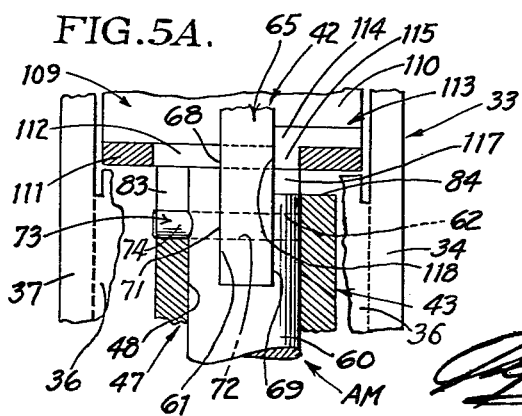
FIG. 5.
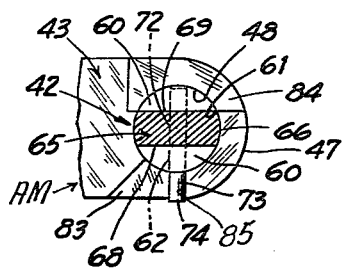
Inventor Nov. 20, 1962 G. T. RANDOL 3,064,764
DISC-TYPE BRAKE
Filed Aug. 2, 1960 3 Sheets-Sheet 3
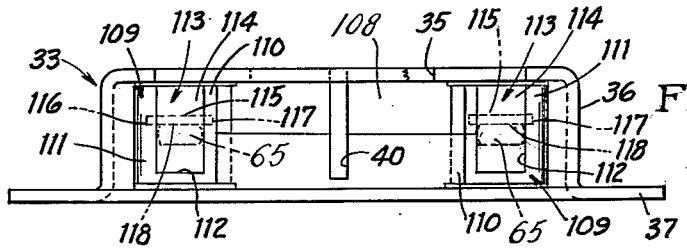
FIG. 7.
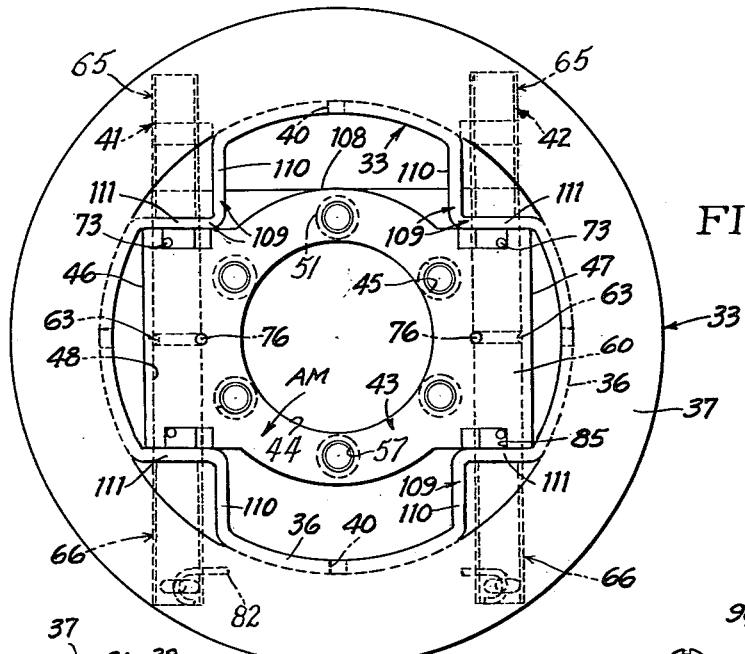
FIG. 6.
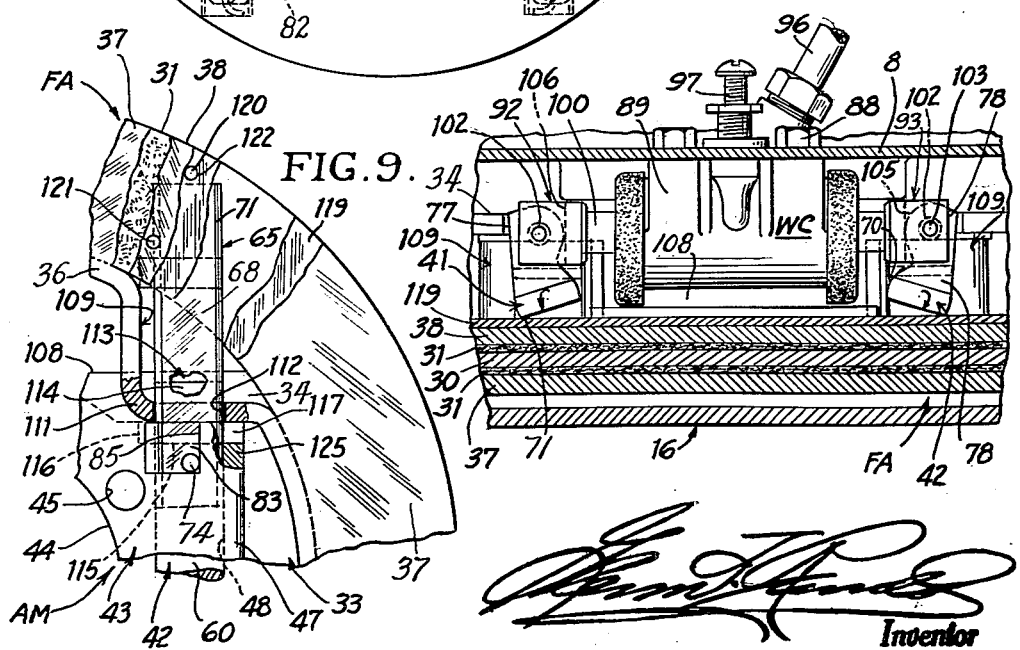
FIG. 9.
FIG. 11.
Inventor

United States Patent Office 3,064,764
Patented Nov. 20, 1962

3,064,764
DISC-TYPE BRAKE
Glenn T. Randol, 2nd Ave. and Paull St., Box 275, Mountain Lake Park, Md.
Filed Aug. 2, 1960, Ser. No. 47,025
17 Claims. (Cl. 188—72)

This invention relates to brake systems and more particularly to a disc-type brake assembly applicable to the wheels of automotive vehicles or the like, although it is obviously feasible for other applications characterized by frictional control of a rotatable member.

In the art of disc brakes, the common approach has been to utilize a plurality of frictionally engageable annular discs, with one of the discs being rotatable with the wheel and usually two other discs being carried by the axle housing which supports the wheel in such manner that the other discs are held against rotation relative to the axle housing on which they can move axially virtually free of friction into engagement with the one disc for braking the wheel, such prior art disc brakes having the disadvantage of requiring special, usually concentric to the axis of the wheel axle, hydraulic actuators or cylinders thus radically departing from the well-known construction of the simple shoe-type brake, but none which could utilize the conventional wheel cylinder to actuate a disc assembly in substantially the same operating position as formerly occupied in the conventional shoe-type brake with only minor structural changes being required in the associated wheel to axle-housing assembly.

The primary object of this invention is to produce a novel and improved disc-type brake assembly of the last-mentioned type wherein the conventional wheel cylinder is employed to actuate a plurality of juxtaposed annular friction members toward each other to engage the same, said members including at least one interposed complemental annular friction member co-rotatable with the wheel drum, the other of said friction members being adapted to have only relative axial movement with respect to one another and to the wheel support housing in a direction parallel to the axis of the rotation of the wheel, actuating of the friction members being preferably effected by novel cam means having two rotatable camming elements each having a pair of opposed camming surfaces at opposite ends thereof, which cooperate with complemental confronting working surfaces on two of the other friction members, said camming elements having operative connections with the dual-pistons of the wheel cylinder whereby movement of the pistons apart under influence of hydraulic pressure, rotates said elements in opposite directions from normal brake released position, cooperatively with said complemental working surfaces and thereby axially shifts all of the friction members into frictional engagement to brake the associated vehicle wheel.

An object related in particular to the primary object, is to mount all of the friction discs in a novel manner to have relative axial "floating" movement individually and as a unit with respect to the wheel and support housing, wherefore to compensate for lining wear and wear between the actuating parts for the friction discs as well, and to preferably support the camming elements for rotation on a stationary member, said elements being disposed in parallel relationship, one on each side of the axis of rotation of the brake drum, and so arranged about said axis as to apply balanced pressures on the brake discs for uniformity of frictional contact therebetween.

More specifically, the disc brake of this invention provides a novel and improved disc assembly and cam actuating means therefor, wherein two annular discs are axially movable relatively to the wheel support housing, and to each other and are interlocked to prevent relative rotational movement therebetween, and operatively positioned between these two discs is a third disc having its opposite sides provided with composition facings and its peripheral portion splined-connected to the interior of the wheel drum for co-rotation therewith, said splined-connection accommodating relative axial movement of the third disc with respect to said wheel drum and to the two axially movable discs aforesaid.

A further salient feature of this invention related to the object next above is to provide an adapter member for the conventional brake drum for locking at least one of the friction discs to the interior of said drum for co-rotation therewith, to enable easy and economical adaption of the present disc-brake as a replacement unit for the conventional shoe-type assembly, and therefore, making it especially suited to the after-market.

Another object of this invention is the provision of novel stop means for establishing clearance between said discs corresponding to brake released "off" condition, and wherein said means is inherently provided by the normal disposition of the aforesaid camming elements and cooperating working surfaces under influence of a normally preloaded return spring which biases said elements toward one another to normal disposition to render the stop means effective to establish the said disc clearance.

The invention, therefore, provides, for the first time, a novel disc-type brake incorporable between the wheel and support housing therefor in substantially the same space previously occupied by the conventional shoe-type brake, and wherein the principal mechanical and hydraulic components of the well known shoe-type brake with only minor alterations required are utilized to actuate the novel disc assembly disclosed herein which eliminates drum distortion and therefore dangerous brake "fade" resulting from overheating and which provides a simple, efficient, economical, and completely reliable brake mechanism for use on all types of automotive vehicles or other apparatus having a rotatable member to be braked.

Other objects and advantages of the invention not specifically mentioned above will be hereinafter described, or will become apparent to those skilled in the art, upon consideration of the complete disclosure which includes the accompanying drawings wherein:

FIGURE 2 is a vertical section taken along the lines 2—2 of FIGURE 1 particularly illustrating the relative positions of the wheel cylinder and one of the disc-engaging cams rotated thereby;

FIGURE 5 is a view of the top end of one of the embossments on the stationary member taken along the lines 5—5 of FIGURE 1 to show the two cutouts which accommodate rotational movements of one end of the cam connecting pin and sliding movement of the cam working shoe respectively;

FIGURE 5A is a sectional view partly in elevation of the structure shown in FIGURE 5 on an enlarged scale to clarify the detail;

FIGURE 6 is an elevational view of the assembled status of the stationary member and one of the axially movable disc members associated therewith;

FIGURE 7 is a view taken along the line 7—7 of FIGURE 6 showing in particular the cutout for clearance around the lower portion of the wheel cylinder;

FIGURE 8 is another view taken along the line 8—8 of FIGURE 6 particularly showing one of: the spline slots for locating the other axially movable disc member against relative rotation with respect to the one disc member;

FIGURE 9 is a fragmentary view on an enlarged scale taken from FIGURE 6 to clarify details of one of the upper camming members and related structure actuated thereby;

FIGURE 10 is a view of one of the composite actuating elements per se in assembled status; and FIGURE 11 is a view similar to FIGURE 3 showing a relatively adjusted disposition of the parts corresponding to frictional engagement of the disc members to effect a brake application.

Figure 1:
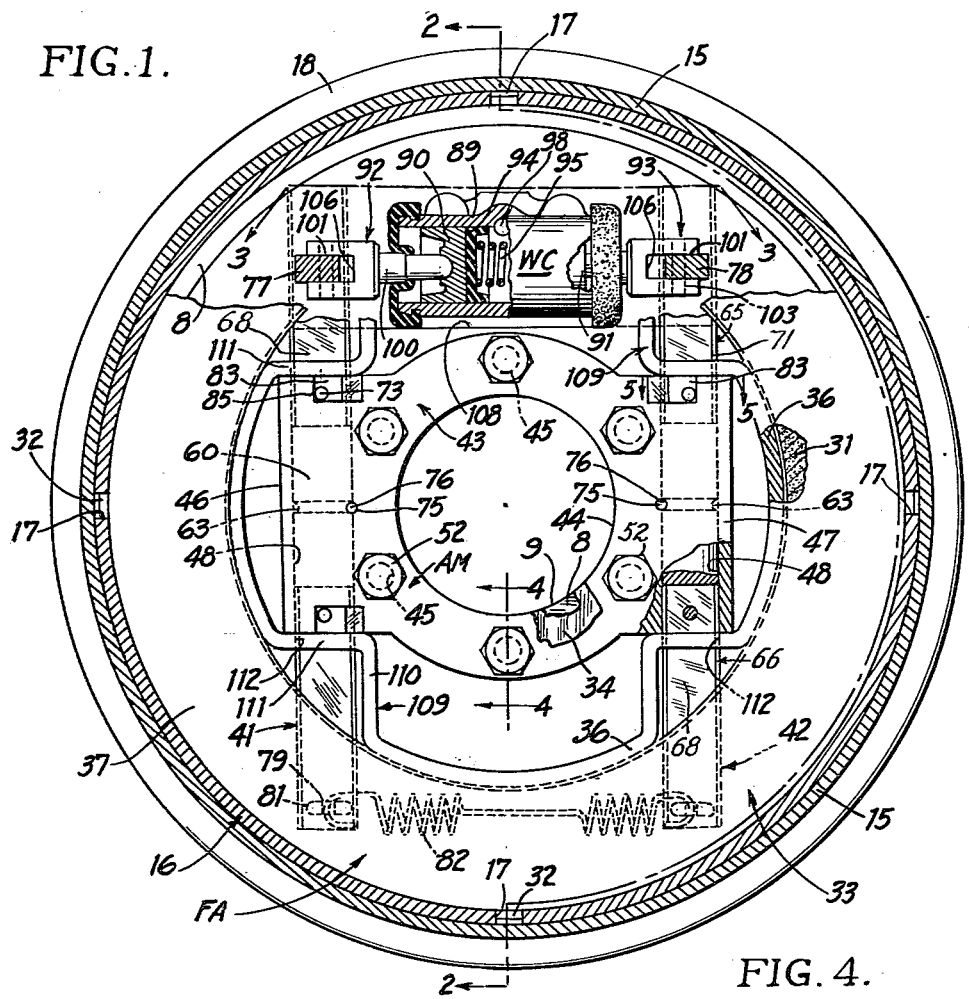
FIGURE 1 is a side elevation partly in section of a disc brake assembly incorporating the principles of the present invention, said assembly being shown in brake released "off" disposition.

Referring to the drawing, a fixed support member or backing plate 8 usually formed of sheet metal to the desired configuration, is provided with a central circular opening 9 and a plurality of radially disposed bolt holes 10 circumferentially spaced in the marginal portion defining said opening, and by which the backing plate may be mounted on a suitable stationary part of the vehicle such as, for example, the rear axle housing flange shown fragmentarily at 11.

The conventional wheel (brake) drum shown at 15 is provided with an interfitting cup-shaped adapter member 16, the latter member being provided with a plurality of circumferentially spaced slots 17 in its cylindrical wall 18 and the end wall 19 thereof contiguous to the end wall 20 of the brake drum to lie closely juxtaposed therewith as shown, and circular openings 21, 22 are provided in said end walls 19, 20 respectively in coaxial disposition with respect to opening 9, the marginal portions defining the latter two openings having a plurality of aligned bolt holes 23, 24 respectively through which headed bolts 25 projected to the exterior of the brake drum for attaching the vehicle wheel thereto for co-rotation therewith, the heads 26 on the bolts 25 are received by the larger holes 23 in the adapter member to lock the latter member to the rum to rotate together. Retention washers 27 having a plurality of inwardly projecting radial teeth 28 interconnected at their outer ends by a circular web 29, serve to bite into the cylindrical surface of the bolts heads to stabilize the adapter member 16 in its operative position within the brake drum as shown.

A disc-type friction assembly generally designated "FA" comprises an annular disc member 30 having a pair of identical composition linings or facings 31, one on each side thereof suitably secured thereto as by bonding, and a plurality of circumferentially spaced projections disclosed herein as splines 32 define the outer periphery of said disc member and which slidably engage the slots 17 in the adapter member 16 to lock the latter member to the disc member for co-rotation and to accommodate relative axial sliding movement of the latter member with respect to the adapter member 16 and therefore the brake drum 15. A cylindrical cup-shaped member 33 includes a vertical wall 34 having a central circular opening 35 coaxial with the opening 9 in the backing plate, a cylindrical wall 36 normal to the outer peripheral portion of the vertical wall, and intergral with the cylindrical wall is a terminating annular disc member 37 normal thereto. A third annular disc member 38 has its inner peripheral edge characterized by a plurality of circumferentially spaced projections herein disclosed as splines 39 which slidably engage complemental longitudinal slots 40 through the cylindrical wall aforesaid of the member 33 to lock the annular member 33, 38 against relative rotation and accommodate relative axial sliding movement therebetween whereby the friction assembly FA is capable of axial "floating" movement as a unit relative to the brake drum 15, and of relative axial movement of its members when disengaged or in process of engaging. This "floating" action, therefore, enables the friction disc assembly FA to compensate for wear in the linings 31 by axially adjusting relatively as a unit with respect to the brake drum and actuating mechanism therefor, and by relative axial adjustments of the three disc members separately disclosed herein as annular plates 30, 37, 38 as wear in the linings and mechanism require.

Actuating mechanism for the disc members 33, 38 is illustrated as a whole at "AM" and comprises: a pair of composite actuating elements 41, 42 rotatably mounted in a stationary annular member 43 having a central circular opening 44 coaxial with the openings 9, 21, 22 and 35 aforesaid, and a like plurality of bolt holes 45 in alignment with holes 10, through the marginal portion defining said opening 44. The stationary member is also provided with a pair of diametrically disposed elongated embossments 46, 47 in parallel relationship, one on each side of the axis of rotation of the brake drum, and each of said embossments having a bore 48 coextensive therewith. A like number of bolt holes 50 are provided in alignment with the aforesaid holes 45, in the cup-shaped member 33, the holes 50 being of larger diameter than the holes 45, to receive an annular spacer 51 in each of them between the encircling marginal portions of each of said holes 45 in the member 43 and the complemental marginal portions encircling the holes 10 in the backing plate. A like number of headed bolts 52 (see FIGURE 4) are provided with a normal body portion 53 leading from the head and merging with a reduced diameter portion 54 which defines an annular external shoulder 55 with the normal body portion, with the reduced portion having a terminal threaded portion 56. The normal body portions 53 of the bolts 52 project through the holes 45 to engage their respective shoulders 55 with one end of the spacers 51, with the reduced diameter portions 54 extending through holes 57 in the spacers of substantially the same size as those in the backing plate aforesaid, into threaded engagement, for example, with complementally threaded holes 58 in the flange 11 as shown in FIGURE 1, to thereby mount the actuating mechanism and the friction disc assembly FA in operative association within the brake drum 15 with the fixed backing plate 8, and to one another. The spacers 51 are tightly impinged between the bolt shoulders 55 and backing plate 8 by the bolts 52 to support the actuating mechanism AM and friction disc assembly FA in coaxial operative disposition and accommodate relative opposite rotational movements of the elements 41, 42.

Each of the actuating elements, 41, 42 comprises a cylindrical shaft 60 coextensive with and rotatably mounted in the bores 48, with each end thereof cross slotted at 61, and cross bored at 62 to intersect each of said slots 61, and an annular groove 63 equidistant from each end of the shaft, said groove in cross section having a semicircular configuration. Each of the end slots 61 receives the inner end of an upper and a lower camming member 65, 66 respectively, which may be economically produced from round stock flatted on its opposite sides 68, 69 respectively as shown in FIGURE 9 to provide, leading camming edges 70, 71 respectively. A hole 72 is provided through the flatted inner ends of each camming member, in alignment with the cross bores 62 through which a pin 73 is pressfitted or otherwise securely installed with its forward end 74 projecting beyond the cylindrical surface of the shafts 60 as shown in FIGURE 5. Accordingly, it is seen that each of the actuating elements 41, 42 is composed of the shaft 60 and two oppositely projecting camming members 65, 66 connected to the shaft by the end slots 61 for co-rotation, while the pins 73 maintain the shaft and its two associated camming members in assembled status, said pins also facilitating assembly of the camming members and the disc members actuated thereby as will be more fully explained hereinafter.

A pair of diametrically disposed holes 75 pass through the embossements of the stationary member 43 and tangentially intersect the bores 48 respectively. Locking pins 76 are pressfitted or otherwise secured in said holes to engage said annular grooves 63 and thereby lock the shafts 60 against relative axial displacement while accommodating rotational movement thereof in their respective bores 48. In this manner the actuating elements 41, 42 are maintained in operative disposition with respect to the stationary member 43 and to the disc members aforesaid actuated thereby. The two upper camming members 65 are provided with intermediately disposed laterally extending arms 77, 78 respectively, best demonstrated in FIGURES 3, 7, and 8, and adjacent each of the outer ends of the lower camming members 66, a threaded hole 79 is provided to receive the threaded leg 80 of an eye 81 whereby opposite ends of a normally preloaded return spring 82 are attached to bias the actuating elements 41, 42 to normal brake "off" disposition as shown in FIGURES 1, 2, and 3 wherein the disc members are disengaged.

Reference is now made to FIGURE 5 which demonstrates the construction and function of the forward ends 74 of the pins 73. The upper ends of the embossments 46, 47 are formed with two radial cutouts 83, 84 with the cutout 83 having a wall 85 which lies contiguous to the exposed portion of the pin 73 to serve as stop means for the actuating elements 41, 42 whereby the normal disposition thereof is established under influence of the biasing action of the return spring 82 aforesaid, the width of the cutout 83 being sufficient to accommodate the rotational sweep of the pin 73 as the actuating elements 41, 42 are rotated under influence of the conventional hydraulic wheel cylinder generally designated "WC" which serves as the operating means for the elements 41, 42 which in turn act on the friction disc assembly FA to engage the same, said cylinder being secured to the backing plate 8 as by the two disclosed cap bolts 88. This wheel cylinder is of the conventional type and is provided with a cylindrically bored body 89 fitted with two oppositely movable pistons 90, 91 having operative connections 92, 93 respectively with arms 77, 78 respectively as shown, for separating said arms and thereby rotate the actuating elements 41, 42 to operate the friction disc assembly FA, said pistons having the usual cup-like pliant seals 94, with an interposed normally preloaded spring 95 to maintain the seals and pistons in operative contact and the pistons in follow-up engagement with the arms 77, 78 activated thereby. The previously mentioned cam return spring 82 is stronger than spring 95 to enable the former spring to reset the cams 41, 42 in normally released status wherein the friction discs actuated thereby are disengaged as shown in FIGURE 1. The wheel cylinder WC is also provided with the customary fluid inlet passage 96 shown in FIGURES 2 and 3 and bleeder screws 97 associated with a passage 98. The aforesaid operative connections 92, 93 each comprises a piston rod 100 engaging the piston, and the outer end of the rod cross slotted horizontally at 101, a cross bore 102 intersecting the cross slot, and a pin 103 driven in said bore through a free hole 104 through the free ends of the arms 77, 78 which project into said cross slots for the arcuate confronting edges 105 to bear on the bottom walls 106 respectively of the aforesaid slots whereby the free hole accommodates the arcuate edge on the arms 77, 78 to continuously engage the walls 106 under influence of hydraulic pressure in one direction and the said spring 95 in the opposite direction, and also prevent fortuitous displacement of the arm ends out of engagement with the slotted ends of the piston rods as shown.

Referring now to FIGURES 6, 7, 8, and 9, it is important to note that the cylindrical wall 36 of the cup-shaped member 33 has an upper segment removed at 108 to avoid interference with the underside of the wheel cylinder body, thus the wheel cylinder WC is cradled in the rectangular opening provided by removal of this portion of the cylindrical wall. This latter wall is formed with four circumferentially spaced inwardly disposed offsets 109. Each of these offsets has a vertical wall 110 and a horizontal wall 111 normal to the vertical wall as an integrated continuation of the cylindrical wall portions between said offsets (see FIGURE 9). Each of the horizontal walls preferably has a rectangular cutout 112. A hardened detachable working shoe 113 lies at one end of each of said cutouts in engagement therewith, said shoe comprising a horizontal segment 114 which overlies the marginal portion of the horizontal wall adjacent said engaged end of the cutout, and a vertical segment 115 normal to the segment 114 and which projects through the cutout is provided with oppositely disposed lugs 116, 117 which underlie the marginal portion of the cutout adjacent the opposite sides thereof from the engaged end aforesaid, to stabilize the shoe in its operating position against the end of said cutout, said vertical wall providing a working face 118 (see FIGURE 7). Installation of the shoe is effected by first inserting the lug segment through the cutout at an angle with respect thereto and then turning the shoe while maintaining the lugs parallel to the underside of the segment 114 to its normal position as shown.

Figures 3, 4:
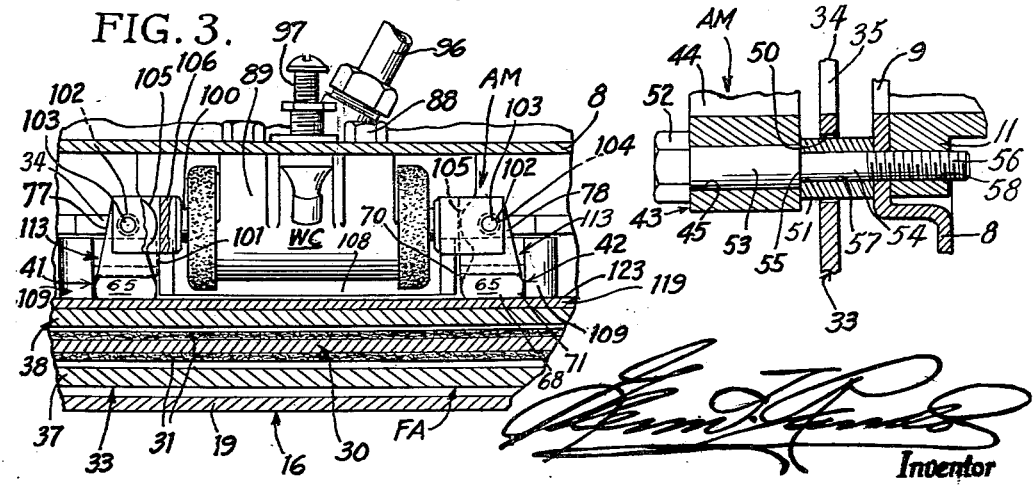
FIGURE 3 is a view taken from the line 3—3 of FIGURE 1 showing particulars of the conventional hydraulic wheel cylinder mechanically connected to actuate the novel friction disc assembly into engaging relation.
FIGURE 4 is a fragmentary sectional view taken from FIGURE 1 along the line 4—4 thereof to show details of structure associated with one of the anchor bolts for the stationary assembly of said disc brake.

A hardened annular working plate 119 is disposed contiguous to the annular disc member 38 on the side opposite its friction surface which engages the lining 31 on the disc member 30 as shown in FIGURES 2 and 3. This working plate is stabilized on the disc member by means of a plurality of pins 120 which are pressfitted or otherwise made rigid with the member 38, into holes 121 with the exposed ends of these pins projecting through holes 122 in the working plate as shown in FIGURE 2. It is therefore seen that the shoes 113 present working faces 118 which confront the working face 123 on the plate 119 in spaced relation thereto. Projecting through each of the spaces aforesaid between the faces 118, 123 are the outer portions of the upper and lower camming members 65, 66 with their opposed flats 68, 69 normally parallel to the cooperating working faces 118, 123 aforesaid respectively in contiguous relationship to said opposed flats (see FIGURES 3 and 7), rotation of the camming members 65, 66 to the positions of FIGURE 11 will effect further spatial separation of the working faces on the shoes and the plate 119 and thereby draw the three annular disc members 30, 37, and 38 together to frictionally engage the same to brake the associated vehicle wheel as is understood.

The camming members 65, 66 are hardened to make their opposed camming edges 70, 71 compatible with the hardened working faces on the shoes 113 and the plate 119 for long service wear without frequent replacement or maintenance otherwise such as lubrication.

The radial cutout 84 previously mentioned in connection with the upper ends of the embossments 46, 47 is of such depth as to accommodate relative sliding movement of the lug segment of the shoes 113 in unison with the cup-shaped member 33 during actuation of the disc members to apply and release the brake action, and the slotted ends of the two shafts 60 have the ends 125 of the sides of the slots adjacent the cutout 84 in the embossments, flush with the bottom of said cutouts to present a smooth surface for the lug segment of the shoes to slide on best demonstrated in FIGURE 8.

Since the normal body portion 53 of the bolts 52 is substantially coextensive with the thickness of the stationary member 43, these bolts serve when drawn up to rigidly hold the stationary member on the backing plate 8, and as shown in FIGURE 2, the spacers 51 projecting through the holes 50 in the cup-shaped member 33 serve as a bearing support for the latter member to slide on, and in the normal disposition thereof in the above figure, the vertical wall 34 of this member is spaced from the backing plate 8 to accommodate relative axial movement for frictional engagement of the discs 30, 37, 38 under influence of the actuating elements 41, 42 rotated to the operating positions shown in FIGURE 11.

Again referring to FIGURES 6, 7, and 8 wherein the cup-shaped disc member 33 is illustrated per se, it should be noted that the lengths of the slots 40 are such as to provide for relative axial adjustments between all three disc members and movement of these three disc members as a unit when engaged to new axial positions resulting from wear in the linings 31 so that the rotative motion imparted to the four camming members 65, 66 under influence of the energized wheel cylinder WC to the operating positions of FIGURE 11, disposes the flatted sides 68, 69 at an angle to the cooperating working faces aforesaid on the shoes 113 and plate 119 respectively and thereby axially move the confronting frictional surfaces on the disc members 37 and 38 into frictional engagement with the linings 31 on the disc member 30 co-rotatable with the adapter member 16 and brake drum 15 to effect the desired braking action as is understood.

This twisting (rotative) action of the camming elements 65, 66 to axially draw the disc members 37, 38 toward each other into frictional engagement with the disc member 30 may be induced to any magnitude within the limits of the operating capacity of the hydraulic wheel cylinders according to the pressure applying force such as that derived from the master cylinder (not shown) utilized to actuate such wheel cylinders of a hydraulic brake system.

To release the braking action, the operator merely removes the actuating pressure from the wheel cylinders so that the pistons thereof may assume their normal disposition as shown in FIGURE 1 under influence of the return spring 82 wherein the camming flats 68, 69 are normally disposed as shown in FIGURES 3 and 7 to lie parallel with the opposed working faces 118, 123 aforesaid on the shoes 113 and plate 119 respectively and thereby releases the disc members 30, 33, 38 to disengage thus freeing the disc member 30 co-rotative with the wheel drum 15 to relieve the braking action from the associated vehicle wheel.

In the normal disposition of the camming flats 68, 69 the cooperating working faces on the shoes 113 and plate 119 are in full contact, or optionally minutely spaced as shown. If the former relationship is used, then the upper camming members 65 cooperate with the stop means 72, 85 to establish the released disposition of the friction disc assembly FA, while in the latter arrangement, the stop means alone would serve to establish such disposition.

*Operation*

The operation of my improved disc-type brake is believed manifest from the foregoing description, and therefore, only a brief restatement will be given as a matter of further clarification as follows:

Assuming that the brake assembly is in the normal disposition shown in FIGURE 1, and that the brake drum 15 and associated vehicle wheel (not shown) are rotating in the direction of the arrow applied to this part. Under these circumstances, the lined disc member 30 co-rotative with said drum is freely rotating between the pressure-applying disc members 37, 38 due to the latter being in their fully separated disposition as shown in FIGURES 2 and 3 with the upper and lower camming members 65, 66 in their respectively established normal positions as defined by their flats 68, 69 in parallel relation to the working faces 118, 123 on the shoes 113 and plate 119.

Actuation of the disc members 33, 38 into engagement with the lined disc member 30 may now be followed from initial stage of what may be termed "slack-take-up" through to the desired stages of effective braking action, upon reference to FIGURES 1 and 11 respectively wherein it is seen that energization of the conventional wheel cylinder WC forces the pistons 90, 91 apart to the position of FIGURE 11, to thereby rotate arms 77, 78 apart in opposite directions which movements are transmitted to the actuating elements 41, 42 and thereby effect simultaneous rotation of the upper and lower camming members 65, 66 respectively in corresponding directions as indicated by the arrows applied to these parts in FIGURE 11. These simultaneous rotational movements imparted to the camming members 65, 66 carry through into camming engagement via the leading edges 70, 71 with the opposed working faces 118, 123 on the shoes 113 and plate 119 respectively, to axially move the disc members 33, 38 toward each other into frictional engagement with the lined disc member 30 co-rotative with the brake drum to brake the associated vehicle wheel (not shown). The degree of frictional braking action being determined by the pressure force on the column of brake fluid connected to the inlet passage 96 in the wheel cylinder WC as is understood.

It is, therefore, evident that the braking action provided by my novel disc assembly FA in the present invention may be varied to produce the desired stoppage of wheel rotation, and such braking action may be released as desired in accordance with the rate of pressure reduction to normal brake "off" disposition wherein the parts assume their relative normal positions as depicted in FIGURE 1.

As the brake linings 31 wear, or abnormal tolerances devolp as a result of wear between the operating parts of the brake assembly, the friction assembly FA axially adjusts as a unit and the disc members 30, 33, 38 individually, to compensate for such lost-motion so that at all frictionally engaged positions of the friction assembly FA, a uniform frictional coefficient is effective to the degree of braking action desired through the full service life of the linings 31. As such wear occurs, the rotational movements of the camming members 65, 66 increase to effect frictional clamping of the disc members 30, 33, 38 at their newly adjusted axial positions of engagement, such increase in the simultaneous rotational movements of the camming members 65, 66 requiring further separation of the arms 77, 78 with corresponding additional separation of the wheel cylinder pistons 90, 91 from their normal positions. The rotational sweep of the camming members 65, 66 being such as to provide effective engagement of the leading edges 70, 71 with the working faces 118, 123 on the shoes 113 and plate 119 respectively, without reaching a lock position with respect thereto which could result should the opposite arcuate surfaces which interconnect the flats 68, 69 engage both working faces to negate the camming effect due to the line of force passing through the diameter between said arcuate surfaces.

The invention therefore contemplates that no manual adjustments are required through the full service life of the linings 31, which when exhausted, are renewable by merely replacing the disc member 30 with a newly lined member. This simple and inexpensive servicing should keep the brake assembly at maximum efficiency until a newly lined disc member is required.

While the disc brake illustrated and described herein represents a rear wheel brake of a motor vehicle, it is obvious from the disclosure that similar brake assemblies are equally suitable for use on the front wheels of a motor vehicle, and the only modification that would be required would be in the specific construction of the backing plate 8, such structural change being necessary only because of the need to mount the brake assembly on a rear axle housing, in the case of a rear wheel brake, and on the front wheel spindle support in the case of a front wheel brake as is understood.

The invention further contemplates use of the disclosed conventional wheel cylinder WC as the operating means for the friction disc assembly FA, or optionally, a pair of hydraulically interconnected single-piston wheel cylinders may be employed in lieu of the aforesaid dual-piston cylinder. In the latter case, one cylinder would be operatively connected to one of the actuating elements 41, 42, and the other cylinder connected to the other actuating element, to simultaneously rotate said elements when the two cylinders are energized. The said operating means may also include cam and/or lever mechanism in lieu of or as an auxiliary to the hydraulic wheel cylinder, to actuate the elements 41, 42 frictionally engage the annular disc members 30, 37, and 38 to brake the associated wheel.

It is, therefore, seen from the foregoing description considered in conjunction with the drawing, that the invention contributes a novel friction disc assembly to replace the conventional shoe-type brake assemblies, the interposition of which with respect to the backing plate 8 and wheel drum 15 produces a highly efficient braking action that will not "fade" as a consequence of thermal conditions due to sustained braking, and that is capable of being mechanically or hydraulically actuated.

While I have shown, by way of example, two actuating elements 41, 42 disposed in parallel relation, one on each side of the axis of rotation of the brake drum, it should be appreciated that further variations in the arrangement of this structure of the invention may be desirable, particularly as to the number of camming members 65, 66 which may be increased to augment surface contact acted on by added leading edges as is understood, and furthermore, the camming members 65, 66 may be set in operative positions different to the parallel disposition herein disclosed, and may have wider flats for increased surface contact with correspondingly larger working faces 118, 123 on the shoes 113 and plate 119 respectively to reduce the rotational angle of movement of the elements 41, 42 to actuate the disc members, it being essential that the pressures applied to the disc members by said camming edges 70, 71 be balanced so that the friction assembly FA is activated in a true axial path free of any pressures tending to angulate the discs and therefore distort the discs out of true parallelism resulting in impairment of the braking action due to parital frictional engagement thereof. Accordingly, three (3) or more camming members are required to produce such balanced-pressure-actuation of the friction disc assembly FA, but disposition of said members may be set at angles other than parallel as shown.

Assembly of the brake is easily accomplished, however, explanation should be given on the procedure for assembly o the actuating mechanism AM and friction disc assembly FA. The steps are as follows: (1) Insert the shafts 60 in their respective bores 48 in the stationary member 43 and insert the locking pins 76 tightly into the holes 75, (2) assemble the three disc members 33, 30, 38 in that order as shown in FIGURE 2, (3) position the stationary member 43 in cup-shaped member 33 as shown, (4) insert the upper and lower camming members 65, 66 through the rectangular cutouts 112 and between the shoes 113 and plate 119, into the slotted ends of the shaft 60, (5) install pins 73 tightly in the aligned bores 62 and holes 72 to lock the camming members against axial displacement relative to the shafts 60, (6) install the spacers 51 in the holes 50 of the cup-shaped member 33, (7) insert the bolts 52 through the aligned holes in the stationary member 43, spacers 51 and backing plate 8, into threaded engagement with the holes in the housing flange 11 to mount the assembly on the backing plate, (8) install the adapter member 16 in the brake drum as shown, and then position the drum and associated wheel (not shown) on the disc assembly as shown to complete the installation. The axle shaft (not shown) is attached to the brake drum and the latter in turn supports the wheel, said axle shaft passing through the central coaxial openings aforesaid in the stationary member 43, cup-shaped member 33, and backing plate 8 as commercially practiced. Thus, the foregoing steps require that the actuating mechanism assembly is first placed in position in the friction disc assembly, and upon completing assembly of both of these principal components, the wheel drum 15 with its adapter member 16 is placed in position making sure that the projections 32 on the other periphery of the annular lined member 30 enter their respective grooves 17 in the cylindrical wall of the adapter member 16 as shown.

The adapter member 16 is provided as an illustrative construction for utilizing the present invention for the replacement market. However, this adapter member may be dispensed with in the case where the present disc brake is used as original equipment, and wherein the slots 17 would be incorporated directly in the brake drum to receive the splines 32 to lock the disc member 30 to the drum 15.

The rotatable actuating elements 41, 42 are disclosed herein as comprising an intermediate shaft having detachable camming members extending from opposite ends thereof. However, it is obvious from the disclosure that these camming members may be integral with said shafts since said members are formed by opposed flats machined from round stock. It is also important to note in connection with the camming members 65, 66, that the flats may be planar as illustrated or curved according to the camming action desired between the camming edges or surfaces and cooperating working faces 118, 123. Various camming actions may be derived from modifying the cooperating working surfaces between the camming members and disc members 33, 38 actuated thereby, such camming actions not only could improve ease of actuation of the discs but also the design may produce a more rapid disc actuation in relationship to a shorter arcuate travel of the camming members to effect such actuation.

A further structural change would be to substitute for the hardened working plate 119, hardened pads bonded to said disc member 38 in alignment with the flats on the camming members, and since it is contemplated that the disc members may be cast, such hardened pads, and for that matter the detachable shoes 113, may be bonded to their respective disc members during the molding process for economical production of these parts.

The identifying expressions and/or terms of terminology used in the foregoing description and in the appended claims are intended to convey meanings which include the range of reasonable equivalents in the patent sense. For example, the expressions, "disc-brake," "brake," "friction disc assembly," "annular disc members," etc., are intended to include a plurality of friction disc-type members frictionally engageable under influence of rotatable cam means operatively acting between at least two of such plurality to effect such engagement of the plurality, said cam means being rotatable in response to any operating means herein specifically disclosed as the conventional dual-piston wheel cylinder. The terms "vertical," "horizontal," "rear," "front," "top," "bottom," "right," "left," and other directional words or characters are intended to have only relative connotation for convenience in describing the structure in the positions depicted on the drawing, and are not intended to be interpreted as requiring any particular orientation with respect to associated structure external to the present disclosure or the operating position thereof.

Although only a preferred embodiment of my invention is disclosed herein and which is well calculated to fulfill the objects above stated, it will be appreciated that changes and alterations may be resorted to without departing from the proper scope or fair meaning of the subjoined claims.

Having thus described my invention, I claim:

1. In a disc brake adapted for use in cooperation with a rotatable drum and a fixed support member, the improvement which comprises: a pair of annular members coaxially disposed with respect to said support member, each having an annular friction face and a working surface in confronting relation to the other; means for interlocking said pair of members to have relative axial movement only with respect to each other; means for supporting said pair of members on said support member to have relative axial movement only with respect to the latter member; a third annular member having complemental friction faces on opposite sides thereof, and disposed between said pair of members for frictional cooperation therewith; means for connecting the outer periphery of said third member to the interior of said drum for co-rotation therewith and for accommodating relative axial movement with respect thereto; a second support member fixed to said first-mentioned support member in coaxial disposition thereto; a plurality of elongated elements rotatably mounted on said second support member with their axes parallel and perpendicularly intersecting a plane coextensive with the aixs of rotation of said drum; a pair of oppositely disposed planar camming surfaces defining opposite ends of said elements and contiguously disposed normally with respect to said confronting working surfaces on said pair of annular members; a pair of cooperating abutment-engageable portions on at least one of said rotatable elements and said second support member respectively to define the normally disengaged position of said three annular members to release said drum when said portions are engaged; spring means including a normally preloaded spring adapted to react on said rotatable elements to bias them toward normal position; and operating means energizable to rotate said elements in opposition to said spring to dispose said camming surfaces at an angle to said confronting working surfaces and thereby move said pair of annular members toward each other into frictional engagement with said third annular member to brake said drum.

2. In a disc-type brake adapted for use in cooperation with a rotatable drum and a first fixed support member, the improvement which comprises: a first annular member having a centrally apertured portion, an annular friction face portion parallel to said central portion and an intermediate offset portion normal to said central and face portions interconnecting the same; a plurality of circumferentially spaced longitudinal openings through said offset portion; a second annular member provided with an annular friction face portion on one side thereof in confronting relation to the friction face portion on said first annular member; a plurality of circumferentially spaced projections defining the inner periphery of said second annular member, and engaging said openings in said first annular member whereby relative axial movement only is provided between said members; a third annular member disposed between the confronting friction face portions on said first and second annular members; an adapter member interfitting said drum and co-rotational therewith; a plurality of circumferentially spaced grooves in the adapter member, said grooves being parallel with the axis of rotation of said drum; a plurality of circumferentially spaced projections defining the outer periphery of said third annular member, and adapted to engage the grooves respectively in said adapter member to lock the latter and the third member for co-rotation and accommodate relative axial movement of the latter member; means for supporting said first and second annular members on said first support member, to have relative axial movement only with respect to the latter member; a second support member fixed to said first support member in coaxial disposition therewith; another plurality of longitudinal openings through said offset interconnecting portion of the first annular member; a pair of opposed working faces defined by one end of each of said other openings and confronting radially disposed face portion on the second annular member spaced from said one end to produce therewith a normal opening of rectangular configuration at its terminating end adjacent the one end of said other openings; actuatable mechanism mounted on said second support member, said mechanism including a pair of parallel bores open at both ends in said second support member, an element rotatably mounted in each of said bores, a slot in each end of said rotatable elements, a cross bore intersecting each of said slots, a camming member projecting through each of said rectangular openings in close adjacency to said opposed working faces and into each of the slots in the ends of said rotatable elements to lock said members for co-rotation with their respective rotatable elements; a hole through each of the ends of said camming members in said slots in alignment with said cross bores; a pin press-fitted through said cross bore and holes to prevent axial displacement of the camming members with respect to said rotatable elements, one end of said pins projecting beyond the exterior surface of said rotatable elements; an annular groove medially disposed on each of said rotatable elements; a bore through said second support member intersecting each of said grooves; a retaining pin projecting through said last-mentioned bore and groove to prevent axial displacement of said rotatable elements with respect to the bores in which they rotate; a pair of shoulders on said second support member associated respectively with said rotatable elements and the exposed ends of said first-mentioned pins whereby engagement of said exposed ends of the pins with said shoulders defines the normally disengaged condition of the annular members aforesaid; an arm extending laterally from two of the camming members projecting from corresponding ends of said rotatable elements, in spaced relation to each other; and hydraulically-actuated means mounted on said first support member in operative engagement with said arms to separate them from normal disposition and thereby rotate the rotatable elements and their respective connected camming members in opposite directions to enlarge said rectangular openings and thereby move said friction face portions on said first and second annular members into frictional engagement with the interposed third annular member to brake the drum; and a normally preloaded spring reacting on said rotatable elements to oppose hydraulic-actuation thereof.

3. A disc-type brake constructed in accordance with claim 2 wherein the first annnular member is cup-shaped, and is additionally provided with a plurality of bolt holes in the marginal portion of the aperture therein.

4. A disc-type brake constructed in accordance with claim 2 wherein the third annular member co-rotatable with said drum is provided with composition friction linings on opposite sides thereof.

5. A disc-type brake constructed in accordance with claim 2 wherein said second support member is provided with a plurality of circumferentially spaced bolt holes in alignment with the bolt holes in said first annular member, and a pair of elongated embossments in parallelism, one on each side of the axis of rotation of said drum, and through which said bores open at both ends extend.

6. A disc-type brake constructed in accordance with claim 2 wherein said first support member is provided with a central circular opening coaxial with the aperture in the first annular member and the opening in said second support member, and a plurality of bolt holes through the marginal portion encircling said opening in the first support member, and a corresponding number of headed bolts projecting through said bolt holes to effect a unitary assembly of said first and second support members, and to accommodate relative axial movement of said first annular member with respect to said support members.

7. A disc-type brake constructed in accordance with claim 6 wherein the bolt holes through said first annular member are larger in diameter than the holes through said second support member, to receive an annular spacer bearing in each larger diameter hole on which said first annular member is slidably supported, and a bolt hole through each of said spacer bearings through which a reduced diameter terminating portion of said bolts project, and an annular shoulder defined at the point of mergence between the reduced and normal body portions of said bolts projecting through the bolt holes in said second support member, adapted to engage one end of said spacer bearings to impinge them between the first support member and said bolt shoulders whereby threaded terminating portions on said reduced portions of the bolts are adapted to engage complemental internally threaded holes in a member constituting a part of the vehicle axle assembly, to thereby mount the said actuatable mechanism and annular members aforesaid in their operative association within the wheel drum.

8. A disc-type brake constructed in accordance with claim 2 wherein said hydraulic means comprise: a wheel cylinder having a pair of opposed pistons movable apart from normal disposition.

9. A disc-type brake constructed in accordance with claim 2 wherein said hydraulic means comprise: a pair of single-piston wheel cylinders hydraulically interconnected to operate in unison in opposite directions from normal disposition.

10. A disc-type brake constructed in accordance with claim 2 wherein said adapted member is cup-shaped to interfit the interior of the rotatable drum, and comprises: a vertical wall terminating in a cylindrical wall normal thereto and interfits the rotatable drum, said plurality of slots being incorporated in said cylindrical wall; a central circular opening; a plurality of circumferentially spaced holes through the marginal portion defining said last-mentioned opening; a like-number of elements projecting from the rotatable drum through said last-mentioned holes to lock the adapter member for co-rotation with said rotatable drum; and a like-number of retaining elements on the terminating ends of said last-mentioned elements to prevent axial displacement of the adapter member with respect to the rotatable drum.

11. In a disc-type brake adapted for use in cooperation with a rotatable drum, a fixed support member, a hydraulic wheel cylinder provided with two opposed pistons operable therein in opposite directions from normal position, a plurality of frictionally interengageable members in which at least three of them are arranged coaxially in series with respect to the axis of rotation of said drum with the interposed friction member being co-rotational with said drum and axially movable relatively thereto, and the two outer friction members having axial movement only in unison on said support member toward each other into frictional engagement with said third interposed member; a plurality of pairs of confronting working surfaces on the two outer friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; operative connections between said hydraulic pistons and rotatable elements adapted to impart simultaneous rotational movement to said elements in response to operation of said pistons from normal position and thereby displace said pairs of camming surfaces from normal position to an angular position with respect to their cooperating pairs of working surfaces to move the two outer friction members toward each other into frictional engagement with said third interposed friction member to brake said drum; and spring means including a normally preloaded spring adapted to react on said rotatable elements to oppose hydraulic-operation thereof from normal position.

12. In a disc-type brake adapted for use in cooperation with a rotatable drum, a fixed support member, a pair of hydraulic wheel cylinders with each having a piston operable therein from normal position, a plurality of frictionally interengageable members in which at least three of them are arranged coaxially in series with respect to the axis of rotation of said drum with the interposed friction member being co-rotational with said drum and axially movable relatively thereto, and the two outer friction members having axial movement only in unison on said support member toward each other into frictional engagement with said third interposed member; a plurality of pairs of confronting working surfaces on the two outer friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; operative connections between said hydraulic pistons and rotatable elements adapted to impart simultaneous rotational movement to said elements in response to operation of said pistons from normal position and thereby displace said pairs of camming surfaces from normal position to an angular position with respect to their cooperating pairs of working surfaces to move the two outer friction members toward each other into frictional engagement with said third interposed friction member to brake said drum; and spring means including a normally preloaded spring adapted to react on said rotatable elements to oppose hydraulic-operation thereof from normal position.

13. In a disc-type brake adapted for use in cooperation with a rotatable drum, a fixed support member, a plurality of frictionally interengageable members in which at least three of them are arranged coaxially in series with respect to the axis of rotation of said drum with the interposed friction member being corotational with said drum and axially movable relatively thereto, and the two outer friction members hvaing axial movement only in unison on said support member toward each other into frictional engagement with said third interposed member; a plurality of pairs of confronting working surfaces on the two outer friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; spring means including a normally preloaded spring adapted to react on said rotatable elements to establish them in normal position; a pair of abutment-engageable portions on said support member and at least one of said rotatable elements respectively for defining the normal disposition of said elements when said portions are engaged; energizable operating means adapted to rotate said rotatable elements from normal position to displace said pairs of camming surfaces at an agle to their cooperating pairs of working surfaces and thereby move the two outer friction members toward each other into frictional engagement with said third interposed friction member to brake said drum.

14. In a disc-type brake adapted for use in cooperation with a rotatable drum, a fixed support member, a hydraulic wheel cylinder provided with two opposed pistons operable therein in opposite directions from normal position, a plurality of frictionally interengageable members in which at least two of them are arranged coaxially in series with respect to the axis of rotation of said drum with one of said friction members being co-rotational with said drum and axially movable relatively thereto, and the other friction member having axial movement only in unison on said support member toward each other into frictional engagement with said third interposed member;

a plurality of pairs of confronting working surfaces on the two friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; operative connections between said hydraulic pistons and rotatable elements adapted to impart simultaneous rotational movement to said elements in response to operation of said pistons from normal position and thereby displace said pairs of camming surfaces from normal position to an angular position with respect to their cooperating pairs of working surfaces to move the two friction members toward each other into frictional engagement to brake said drum; and spring means including a normally preloaded spring adapted to react on said rotatable elements to oppose hydraulic-operation thereof from normal position.

15. In a disc-type brake adapted for use in cooperation with a rotatable drum, afixed support member, a pair of hydraulic wheel cylinders with each having a piston operable therein from normal position, a plurality of frictionally interengageable members in which at least two of them are arranged coaxially in series with respect to the axis of rotation of said drum with one of said friction members being co-rotational with said drum and axially movable relatively thereto, and the other friction member having axial movement only in unison on said support member toward each other into frictional engagement with said third interposed member; a plurality of pairs of confronting working surfaces on the two friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; operative connections between said hydraulic pistons and rotatable elements adapted to impart simultaneous rotational movement to said elements in response to operation of said pistons from normal position and thereby displace said pairs of camming surfaces from nomal position to an angular position with respect to their cooperating pairs of working surfaces to move the two friction members toward each other into frictional engagement to brake said drum; and spring means including a normally preloaded spring adapted to react on said rotatable elements to oppose hydraulic-operation thereof from normal position.

16. In a disc-type brake adapted for use in cooperation with a rotatable drum, a fixed support member, a plurality of frictionally interengageable members in which at least two of them are arranged coaxially in series with respect to the axis of rotation of said drum with one of said friction members being co-rotational with said drum and axially movable relatively thereto, and the other friction member having axial movement only in unison on said support member toward each other into frictional engagement with said third interposed member; a plurality of pairs of confronting working surfaces on the two friction members respectively, the improvement which comprises: actuatable mechanism including a corresponding plurality of elongated elements rotatably mounted on said support member, each of said elements being characterized by a pair of oppositely disposed planar camming surfaces contiguously disposed normally with respect to each cooperating pair of working surfaces respectively to accommodate disengagement of said friction members; spring means including a normally preloaded spring adapted to react on said rotatable elements to establish them in normal position; a pair of abutment-engageable portions on said support member and at least one of said rotatable elements respectively for defining the normal disposition of said elements when said portions are engaged; energizable operating means adapted to rotate said rotatable elements from normal position to displace said pairs of camming surfaces at an angle to their cooperating pairs of working surfaces and thereby move the two friction members toward each other into frictional engagement to brake said drum.

17. In a disc-type brake adapted for use in cooperation with a rotatable drum, a fixed support member, a plurality of frictionally interengageable members in which at least there are coaxially arranged in series with the two outer friction members being axially movable in unison toward each other into frictional engagement with the interposed third friction member co-rotational with and axially movable relatively to said drum, the improvement which comprises: actuatable mechanism including a plurality of camming elements rotatably supported on said support member with their axes in parallel relationship and intersecting a plane co-extensive with the axis of rotation of said drum, each of said camming elements comprising an elongated cylindrical shaft provided at each end with a pair of diametrically opposed planar surfaces normally contiguous to a pair of cooperating working surfaces on the outer friction members respectively, and means for rotatably mounting said shaft on said support member to be effective to displace said planar surfaces at an angle to said working surfaces to separate the latter thereby imparting axial movement to the two outer friction members toward each other into frictional engagement with the interposed third member to brake said drum; spring means including a normally preloaded spring adapted to bias said camming elements toward normal position; a pair of abutment-engaging portions on said support member and at least one of said camming elements for defining the normal disposition of the latter when said portions are engaged; energizable operating means adapted to rotate said camming elements in unison to effect frictional engagement of said friction members; and means operatively interconnecting said operating means with said camming elements.

References Cited in the file of this patent

UNITED STATES PATENTS

| | | |
|---|---|---|
| 1,567,915 | Cole | Dec. 29, 1925 |
| 2,938,608 | Kershner | May 31, 1960 |

FOREIGN PATENTS

| | | |
|---|---|---|
| 324,793 | Italy | Feb. 16, 1935 |

UNITED STATES PATENT OFFICE
CERTIFICATE OF CORRECTION

Patent No. 3,064,764                           November 20, 1962

Glenn T. Randol

It is hereby certified that error appears in the above numbered patent requiring correction and that the said Letters Patent should read as corrected below.

Column 1, line 42, for "actuating" read -- actuation --; column 2, lines 49 and 63, for "lines", each occurrence, read -- line --; column 3, line 5, after "one of" strike out the colon; line 39, for "projected" read -- project --; column 5, line 55, for "screws" read -- screw --; column 6, line 15, for "oppositedly" read -- oppositely --; column 9, line 48, for "o" read -- of --; column 10, line 5, for "other" read -- outer --; column 14, line 37, for "corotational" read -- co-rotational --; line 60, for "agle" read -- angle --; column 15, line 23, for "afixed" read -- a fixed --; column 16, line 25, for "there" read -- three --.

Signed and sealed this 19th day of January 1965.

(SEAL)
Attest:

ERNEST W. SWIDER                              EDWARD J. BRENNER
Attesting Officer                            Commissioner of Patents